US012407998B2

(12) United States Patent
Umminger, III

(10) Patent No.: US 12,407,998 B2
(45) Date of Patent: Sep. 2, 2025

(54) AUDIO STREAMS IN MIXED VOICE CHAT IN A VIRTUAL ENVIRONMENT

(71) Applicant: Roblox Corporation, San Mateo, CA (US)

(72) Inventor: Frederick William Umminger, III, Oakland, CA (US)

(73) Assignee: Roblox Corporation, San Mateo, CA (US)

( * ) Notice: Subject to any disclaimer, the term of this patent is extended or adjusted under 35 U.S.C. 154(b) by 337 days.

(21) Appl. No.: 18/298,932

(22) Filed: Apr. 11, 2023

(65) Prior Publication Data

US 2024/0349000 A1 Oct. 17, 2024

(51) Int. Cl.
*H04S 7/00* (2006.01)
*G10L 25/78* (2013.01)
*H04S 3/00* (2006.01)

(52) U.S. Cl.
CPC .............. *H04S 7/303* (2013.01); *G10L 25/78* (2013.01); *H04S 3/008* (2013.01); *G10L 2025/783* (2013.01); *H04S 2400/11* (2013.01); *H04S 2400/13* (2013.01)

(58) Field of Classification Search
CPC ...... H04S 7/303; H04S 3/008; H04S 2400/11; H04S 2400/13; G10L 25/78; G10L 2025/783
See application file for complete search history.

(56) References Cited

U.S. PATENT DOCUMENTS

| | | | | |
|---|---|---|---|---|
| 7,006,616 | B1 * | 2/2006 | Christofferson | H04L 65/103 379/202.01 |
| 2020/0058289 | A1 * | 2/2020 | Gabryjelski | G06F 40/58 |
| 2025/0046328 | A1 * | 2/2025 | Sun | G10L 21/028 |

OTHER PUBLICATIONS

Walla, https://en.wikipedia.org/wiki/Walla, 2023, 2 pages.

* cited by examiner

*Primary Examiner* — Linda Wong
(74) *Attorney, Agent, or Firm* — IP Spring

(57) ABSTRACT

A metaverse application receives encoded audio that includes a first audio stream associated with a first avatar in a virtual environment and a first voice-activity detection (VAD) signal for the first audio stream, and a second audio stream associated with a second avatar in the 3D virtual environment and a second VAD signal for the second audio stream. The metaverse application determines that the first avatar is blocked by a user associated with the user avatar. The metaverse application determines that the first VAD signal indicates that the first audio stream includes speech. The metaverse application generates additional audio. The metaverse application mixes the additional audio with the encoded audio. The metaverse application provides the mixed audio to a speaker for output.

20 Claims, 5 Drawing Sheets

AUDIO STREAMS IN MIXED VOICE CHAT IN A VIRTUAL ENVIRONMENT

BACKGROUND

For a server that processes audio streams from thousands of chat participants, it is inefficient to send the audio of all chat participants to all chat clients as individual audio streams because this scales as $N^2$ streams where N is the number of chat participants. As a result, the audio streams are mixed together and sent to chat clients as a mixed stream, which scales as only N streams.

A problem arises once the audio streams are mixed because individual chat participants cannot be muted. This is a problem because it is common in a metaverse or virtual environments for some participants to be abusive in some ways towards other participants. The victims of the abuse typically protect themselves from further abuse by muting the abusive participant. However, implementing the muting of the abusive participant is problematic because their audio stream is mixed in with other audio streams. An audio stream of the abusive participant can be subtracted from the mixed stream, but the subtraction fails unless the timing and audio quality match precisely. More importantly, the subtraction requires sending individual audio streams, which undoes the processing benefits of created a mixed stream.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Embodiments relate generally to a system and method to mute a particular audio stream. According to one aspect, a computer-implemented method performed at a client device associated with a user avatar participating in a three-dimensional (3D) virtual environment hosted by a server includes receiving, from the server, encoded audio that includes a first audio stream associated with a first avatar in the 3D virtual environment and a first voice-activity detection (VAD) signal for the first audio stream, and a second audio stream associated with a second avatar in the 3D virtual environment and a second VAD signal for the second audio stream, wherein the first avatar and the second avatar are different from the user avatar and wherein the first audio stream and the second audio stream in the encoded audio are not separable. The method further includes determining that the first avatar is blocked by a user associated with the user avatar. The method further includes determining that the first VAD signal indicates that the first audio stream includes speech. The method further includes generating, locally at the client device, additional audio. The method further includes mixing the additional audio with the encoded audio. The method further includes providing the mixed audio to a speaker for output on the client device.

In some embodiments, the additional audio includes artificial speech selected from a group of pre-recorded speech sounds, pre-recorded speech-like sounds, speech sounds synthesized in real-time, speech-like sounds synthesized in real-time, and combinations thereof. In some embodiments, the additional audio is associated with a location in the virtual environment that matches a location of the first avatar in the virtual environment, the location of the first avatar includes a spatial location and an orientation of the first avatar in the 3D virtual environment, and generating the additional audio includes generating the additional audio with a decibel level that attenuates as a function of the spatial location and the orientation. In some embodiments, the first VAD signal is generated by a first client device associated with the first avatar. In some embodiments, the first VAD signal is a binary signal generated by the server and the binary signal indicates whether the first avatar is speaking or not speaking based on whether a decibel level of the first audio stream meets a threshold decibel level. In some embodiments, the first VAD signal includes a single bit per time period, a value of the single bit indicates whether the first avatar is speaking, and the time period of the first VAD signal corresponds to a speed of human speech. In some embodiments, determining that the first VAD signal indicates that the first audio stream includes speech is further based on at least one selected from the group of a volume of the first audio stream, a panning coefficient associated with the first audio stream, a per-channel volume coefficient associated with the first audio stream, and combinations thereof.

According to one aspect, non-transitory computer-readable medium with instructions that, when executed by one or more processors at a client device, cause the one or more processors to perform operations, the operations, the operations comprising: receiving, from a server, encoded audio that includes a first audio stream associated with a first avatar in a 3D virtual environment and a second audio stream associated with a second avatar in the 3D virtual environment, wherein the first avatar and the second avatar are different from the user avatar and wherein the first audio stream and the second audio stream in the encoded audio are not separable; determining that the first avatar is blocked by a user associated with the user avatar; generating, locally at the client device, additional audio that is associated with a location in the virtual environment that matches a location of the first avatar in the virtual environment; mixing the additional audio with the encoded audio; and providing the mixed audio to a speaker for output on the client device.

In some embodiments, the operations further include: receiving, from the server, a first VAD signal for the first audio stream and a second VAD signal for the second audio stream and determining that the first VAD signal indicates that the first audio stream includes speech, wherein the additional audio is generated responsive to the determining. In some embodiments, the first VAD signal is generated by a first client device associated with the first avatar. In some embodiments the first VAD signal is a binary signal generated by the server and the binary signal indicates whether the first avatar is speaking or not speaking based on whether a decibel level of the first audio stream meets a threshold decibel level. In some embodiments, the operations further include determining that the first audio stream includes speech based on at least one selected from the group of a first voice-activity detection (VAD) signal for the first audio stream, a volume of the first audio stream, a panning coefficient associated with the first audio stream, a per-channel volume coefficient associated with the first audio stream, and combinations thereof. In some embodiments, the first audio stream is associated with a 3D virtual environment and the additional audio is associated with a location in the virtual environment that matches a location of the first audio stream. In some embodiments, the location of the first avatar includes a spatial location and an orientation of the first avatar in the 3D virtual environment and wherein generating the additional audio includes generating the additional audio with a decibel level that attenuates as a function of the spatial location and the orientation.

According to one aspect, a system includes a processor and a memory coupled to the processor, with instructions stored thereon that, when executed by the processor, cause the processor to perform operations comprising: receiving, from a server, encoded audio that includes a first audio stream and a first voice-activity detection (VAD) signal for the first audio stream, and a second audio stream, where the first audio stream and the second audio stream in the encoded audio are not separable; determining that a first user associated with the first audio stream is blocked by a second user; determining that the first VAD signal indicates that the first audio stream includes speech; generating additional audio; mixing the additional audio with the encoded audio; and providing the mixed audio to a speaker for output to the second user.

In some embodiments, the additional audio includes artificial speech selected from a group of pre-recorded speech sounds, pre-recorded speech-like sounds, speech sounds synthesized in real-time, speech-like sounds synthesized in real-time, and combinations thereof. In some embodiments, the first audio stream is associated with a first avatar in a three-dimensional (3D) virtual environment, the second audio stream is associated with a second avatar in the 3D virtual environment, and the additional audio is associated with a location in the virtual environment that matches a location of the first avatar in the virtual environment, the location of the first avatar including a spatial location and an orientation of the first avatar in the 3D virtual environment and wherein generating the additional audio includes generating the additional audio with a decibel level that attenuates as a function of the spatial location and the orientation. In some embodiments, the first VAD signal is generated by a first client device associated with the first avatar. In some embodiments, the first VAD signal is a binary signal generated by the server and the binary signal indicates whether the first avatar is speaking or not speaking based on whether a decibel level of the first audio stream meets a threshold decibel level. In some embodiments, determining that the first VAD signal indicates that the first audio stream includes speech is further based on at least one selected from the group of a volume of the first audio stream, a panning coefficient associated with the first audio stream, a per-channel volume coefficient associated with the first audio stream, and combinations thereof.

The application advantageously describes a way to effectively erase the voice of a muted player from the mix of audio streams by using synthetic speech to drown out the voice of the muted player and protect users from abusive speech.

DETAILED DESCRIPTION

Example Network Environment 100

Figure 1:
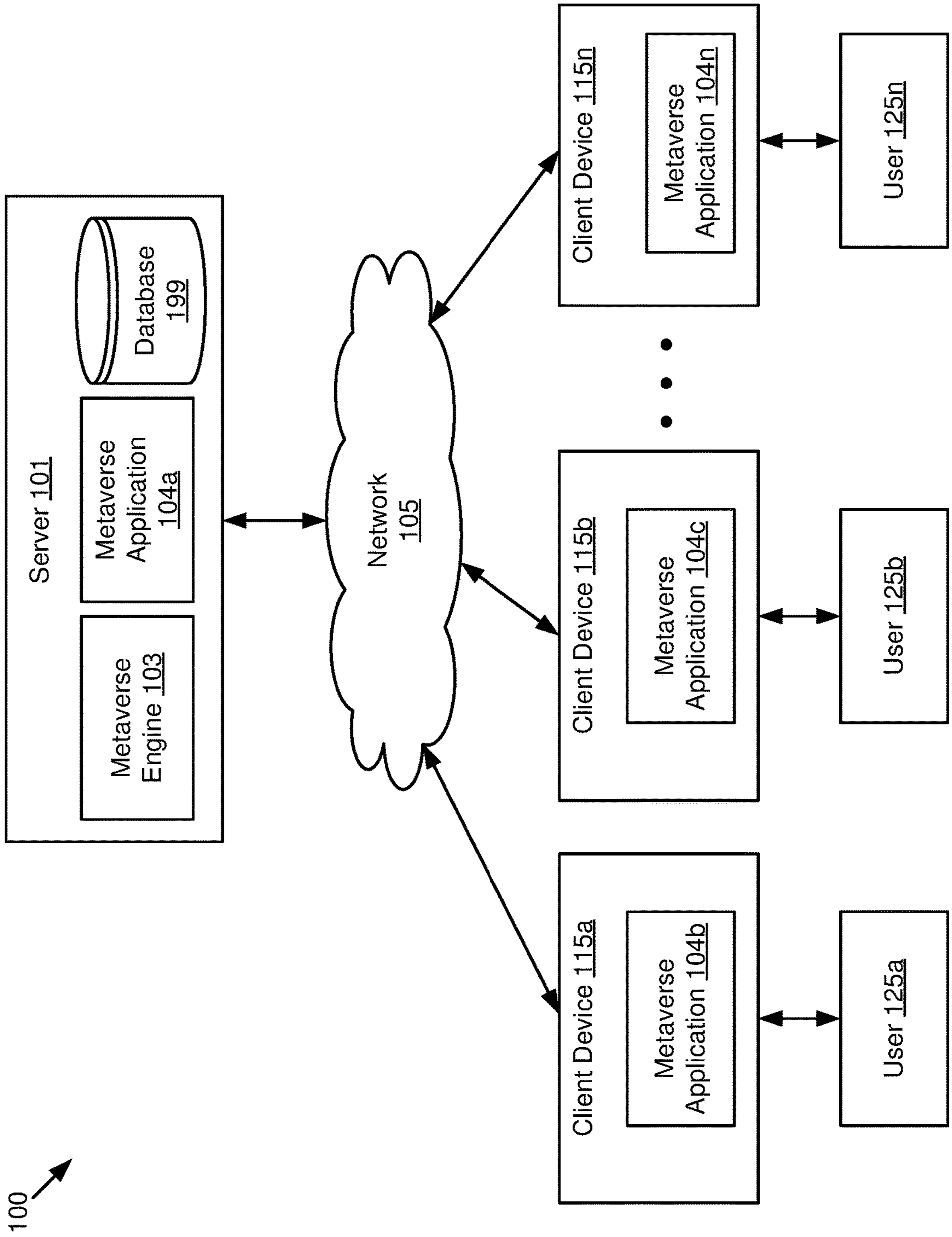
FIG. 1 is a block diagram of an example network environment, according to some embodiments described herein.

FIG. 1 illustrates a block diagram of an example environment 100 to obscure particular audio streams. In some embodiments, the environment 100 includes a server 101 and client devices 115*a* . . . *n*, coupled via a network 105. Users 125*a* . . . *n* may be associated with the respective client devices 115*a* . . . *n*. In FIG. 1 and the remaining figures, a letter after a reference number, e.g., "115*a*," represents a reference to the element having that particular reference number. A reference number in the text without a following letter, e.g., "115," represents a general reference to embodiments of the element bearing that reference number. In some embodiments, the environment 100 may include other servers or devices not shown in FIG. 1. For example, the server 101 may include multiple servers 101.

The server 101 includes one or more servers that each include a processor, a memory, and network communication hardware. In some embodiments, the server 101 is a hardware server. The server 101 is communicatively coupled to the network 105. In some embodiments, the server 101 sends and receives data to and from the client devices 115. The server 101 may include a metaverse engine 103, a metaverse application 104*a*, and a database 199.

In some embodiments, the metaverse engine 103 includes code and routines operable to generate and provide a metaverse, such as a three-dimensional virtual environment. In some embodiments, the metaverse application 104*a* includes code and routines operable to receive audio streams associated with avatars in the virtual environment from client devices 115. The metaverse application 104*a* decodes the audio streams, mixes the audio streams, encodes the mixed audio stream, and transmits the encoded audio to client devices 115. For example, the metaverse application 104*a* may receive a first audio stream from client device 115*a* and a second audio stream from client device 115*b*. The metaverse application 104*a* generates mixed audio from the first audio stream and the second audio stream, encodes the mixed audio, and transmits the encoded audio to client device 115*n*. The first audio stream and the second audio stream in the encoded audio are not separable.

In some embodiments, the metaverse application 104*a* also generates a voice-activity detection (VAD) signal for each audio stream and transmits the VAD signals to the client device 115*n*. The VAD signal is a binary signal that indicates whether an avatar is speaking or not speaking. In some embodiments, the VAD signals are generated by respective client devices 115 and received by the metaverse application 104*a* for transmitted to the client device 115*n*. In some embodiments, the metaverse application 104*a* bundles the encoded audio with the VAD signal and transmits the bundle to the client device 115*n*.

In some embodiments, the metaverse engine 103 and/or the metaverse application 104*a* are implemented using hardware including a central processing unit (CPU), a field-programmable gate array (FPGA), an application-specific integrated circuit (ASIC), any other type of processor, or a combination thereof. In some embodiments, the metaverse engine 103 is implemented using a combination of hardware and software.

The database 199 may be a non-transitory computer readable memory (e.g., random access memory), a cache, a drive (e.g., a hard drive), a flash drive, a database system, or another type of component or device capable of storing data. The database 199 may also include multiple storage components (e.g., multiple drives or multiple databases) that may also span multiple computing devices (e.g., multiple server computers). The database 199 may store data associated with the virtual experience hosted by the metaverse engine 103, such as a current game state, user profiles, etc.

The client device 115 may be a computing device that includes a memory, a hardware processor, and a camera. For example, the client device 115 may include a mobile device, a tablet computer, a mobile telephone, a wearable device, a head-mounted display, a mobile email device, a portable game player, a portable music player, a game console, an augmented reality device, a virtual reality device, a reader device, or another electronic device capable of accessing a network 105.

Client device 115*a* includes metaverse application 104*b*, client device 115*b* includes metaverse application 104*c*, and client device 115*n* includes metaverse application 104*n*. In some embodiments, the client device 115*a* provides a first audio stream that is associated with a first avatar to the server 101. Client device 115*b* provides a second audio stream associated with a second avatar to the server 101. The server 101 transmits the VAD signals and the encoded audio that is a mix of the first audio stream and the second audio stream to the client device 115*n*.

The metaverse application 104*n* on the client device 115*n* determines that the first avatar is blocked by the user 125*n* associated with a user avatar. The metaverse application 104*n* determines that the first VAD signal indicates that the first audio stream includes speech. The client device 115*n* generates additional audio that is associated with a location in the virtual environment that matches a location of the first avatar in the virtual environment. For example, the two locations may be identical (have the same coordinates in the virtual environment), may be locations that are adjacent (e.g., separated by a short distance), etc. For example, the additional audio may be pre-recorded speech sounds, pre-recorded speech-like sounds, speech sounds synthesized in real-time, speech-like sounds synthesized in real-time, etc. The metaverse application 104*n* mixes the additional audio with the encoded audio and provides the mixed audio to a speaker for output on the client device 115*n*.

In the illustrated embodiment, the entities of the environment 100 are communicatively coupled via a network 105. The network 105 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof. Although FIG. 1 illustrates one network 105 coupled to the server 101 and the client devices 115, in practice one or more networks 105 may be coupled to these entities.

Example Computing Device 200

Figure 2:
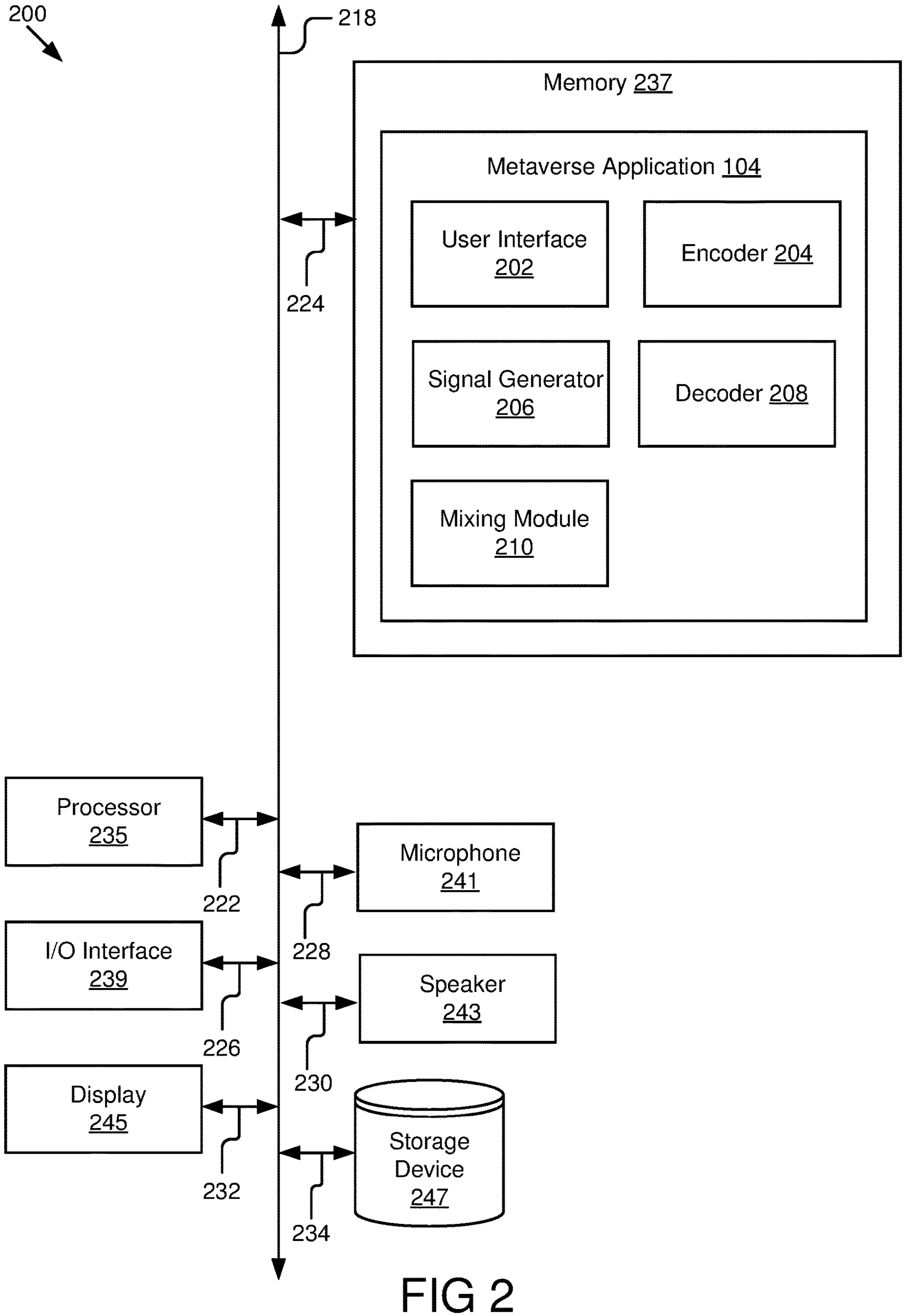
FIG. 2 is a block diagram of an example computing device, according to some embodiments described herein.

FIG. 2 is a block diagram of an example computing device 200 that may be used to implement one or more features described herein. Computing device 200 can be any suitable computer system, server, or other electronic or hardware device. In some embodiments, the computing device 200 is the client device 115. In some embodiments, the computing device 200 is the server 101.

In some embodiments, computing device 200 includes a processor 235, a memory 237, an Input/Output (I/O) interface 239, a microphone 241, a speaker 243, a display 245, and a storage device 247, all coupled via a bus 218. In some embodiments, the computing device 200 includes additional components not illustrated in FIG. 2.

The processor 235 may be coupled to a bus 218 via signal line 222, the memory 237 may be coupled to the bus 218 via signal line 224, the I/O interface 239 may be coupled to the bus 218 via signal line 226, the microphone 241 may be coupled to the bus 218 via signal line 228, the speaker 243 may be coupled to the bus 218 via signal line 230, the display 245 may be coupled to the bus 218 via signal line 232, and the storage device 247 may be coupled to the bus 218 via signal line 234.

The processor 235 includes an arithmetic logic unit, a microprocessor, a general-purpose controller, or some other processor array to perform computations and provide instructions to a display device. Processor 235 processes data and may include various computing architectures including a complex instruction set computer (CISC) architecture, a reduced instruction set computer (RISC) architecture, or an architecture implementing a combination of instruction sets. In some implementations, the processor 235 may include special-purpose units, e.g., machine learning processor, audio/video encoding and decoding processor, etc. Although FIG. 2 illustrates a single processor 235, multiple processors 235 may be included. In different embodiments, processor 235 may be a single-core processor or a multicore processor. Other processors (e.g., graphics processing units), operating systems, sensors, displays, and/or physical configurations may be part of the computing device 200, such as a keyboard, mouse, etc.

The memory 237 stores instructions that may be executed by the processor 235 and/or data. The instructions may include code and/or routines for performing the techniques described herein. The memory 237 may be a dynamic random access memory (DRAM) device, a static RAM, or some other memory device. In some embodiments, the memory 237 also includes a non-volatile memory, such as a static random access memory (SRAM) device or flash memory, or similar permanent storage device and media including a hard disk drive, a compact disc read only memory (CD-ROM) device, a DVD-ROM device, a DVD-RAM device, a DVD-RW device, a flash memory device, or some other mass storage device for storing information on a more permanent basis. The memory 237 includes code and routines operable to execute the metaverse application 104, which is described in greater detail below.

I/O interface 239 can provide functions to enable interfacing the computing device 200 with other systems and devices. Interfaced devices can be included as part of the computing device 200 or can be separate and communicate with the computing device 200. For example, network communication devices, storage devices (e.g., memory 237 and/or storage device 247), and input/output devices can communicate via I/O interface 239. In another example, the I/O interface 239 can receive data from the server 101 and deliver the data to the metaverse application 104 and components of the metaverse application 104, such as the decoder 208. In some embodiments, the I/O interface 239 can connect to interface devices such as input devices (keyboard, pointing device, touchscreen, microphone 241, sensors, etc.) and/or output devices (display 245, speaker 243, etc.).

Some examples of interfaced devices that can connect to I/O interface 239 can include a display 245 that can be used to display content, e.g., images, video, and/or a user interface of the metaverse as described herein, and to receive touch (or gesture) input from a user. Display 245 can include any suitable display device such as a liquid crystal display (LCD), light emitting diode (LED), or plasma display screen, cathode ray tube (CRT), television, monitor, touchscreen, three-dimensional display screen, a projector (e.g., a 3D projector), or other visual display device.

The microphone 241 includes hardware, e.g., one or more microphones that detect audio spoken by a person. The microphone 241 may transmit the audio to the metaverse application 104 via the I/O interface 239.

The speaker 243 includes hardware for generating audio for playback. For example, the speaker 243 receives the mixed audio for output during interaction with the virtual environment from the metaverse application 104. In some embodiments, the speaker 243 may include multiple audio output devices (e.g., stereo speaker with 2 output devices, surround speaker with 3, 4, 5, or more output devices) that produce sound.

In some embodiments, the speaker 243 may reproduce spatial audio by outputting a respective sound from each audio output device to together produce a spatial effect. For example, spatial audio may provide an effect where specific sounds originate from specific locations in a three-dimensional space (e.g., corresponding to avatar locations in the virtual environment). Further, spatial audio may also provide an effect where a listener head orientation may be taken into account while reproducing audio via the output devices to modify the playback such that it matches the current listener head orientation. With spatial audio, the audio experienced by a user 125 may be realistic and match their current location and orientation in the virtual environment.

The storage device 247 stores data related to the metaverse application 104. For example, the storage device 247 may store a user profile associated with a user 125, a list of blocked avatars, synthetic audio, etc.

Example Metaverse Application 104

FIG. 2 illustrates a computing device 200 that executes an example metaverse application 104 that includes a user interface module 202, an encoder 204, a signal generator 206, a decoder 208, and a mixing module 210. In some embodiments, a single computing device 200 includes all the components illustrated in FIG. 2. In some embodiments, one or more of the components are on different computing devices 200. For example, the user device 115 may include the user interface 202, the encoder 204, the decoder 208, and the mixing module 210, while the signal generator 206 is part of the server 101.

The user interface module 202 generates a user interface for users associated with client devices to participate in a three-dimensional virtual environment. In some embodiments, before a user participates in the virtual environment, the user interface module 202 generates a user interface that includes information about how the user's information may be collected, stored, and/or analyzed. For example, the user interface requires the user to provide permission to use any information associated with the user. The user is informed that the user information may be deleted by the user, and the user may have the option to choose what types of information are provided for different uses. The use of the information is in accordance with applicable regulations and the data is stored securely. Data collection is not performed in certain locations and for certain user categories (e.g., based on age or other demographics), the data collection is temporary (i.e., the data is discarded after a period of time), and the data is not shared with third parties. Some of the data may be anonymized, aggregated across users, or otherwise modified so that specific user identity cannot be determined.

The user interface module 202 receives user input from a user during interaction with a virtual experience. For example, the user input may instruct a user avatar to move around in the virtual environment. The user interface module 202 generates graphical data for displaying the location of the user avatar within the virtual environment.

The user avatar may interact with other avatars in the virtual experience. Some of these interactions may be negative and, in some embodiments, the user interface module 202 generates graphical data for a user interface that enables a user to block certain avatars in the virtual experience. For example, the user may block a first avatar, which indicates that the user wants to effectively mute any audio streams generated by the first avatar.

The encoder 204 receives an audio stream that is captured by the microphone 241 when a user provides audio input (e.g., speaks, sings, yells, etc.). In some embodiments, the audio stream is associated with a user avatar. In some embodiments, the user may provide audio input in other ways, e.g., by connecting an auxiliary microphone to a client device 115, by directing pre-recorded or streaming audio as input to the virtual environment, or using any other audio source to provide audio input. The encoder 204 processes the audio stream to remove noise and echo and compresses the audio stream. In some embodiments, the encoder 204 uses a voice codec, such as Opus, to compress (i.e., encode) the audio stream where the bitrate may be about 30,000 bites per second (bps) to allow a full-bandwidth signal. The encoder 204 generates encoded audio from the audio stream and transmits the encoded audio to the server 101.

In some embodiments, the signal generator 206 generates a low bitrate voice-activity detection (VAD) signal for the audio stream. The VAD signal may include a single bit per time period. In some embodiments, the bit single bit has a value of 1 if the avatar is speaking and 0 if the avatar is not speaking. The time period may correspond to a speed of human speech so that it accurately represents voice activity without too much lag and without using extraneous bits. For example, the time period may be ¼ of a second to be equivalent to the length of one syllable of spoken English, giving a low bitrate of four bps for the voice activity information. The VAD signal may be a binary signal that indicates whether the avatar is speaking or not speaking (or more generally, providing audio input or not providing audio input) based on whether a decibel level of the audio stream meets a threshold decibel level. In some embodiments, the user may be a silent participant (e.g., muted) in the virtual environment or may be a spectator avatar that is an observer that is not part of the activity in the virtual environment, and the encoder 204 and signal generator 206 are not used.

The decoder 208 receives encoded audio from the server 101. For example, a user associated with the computing device 200 participates in an experience in the virtual environment where the user has a user avatar that communicates with other avatars in the virtual environment. The user avatar asks a question, the encoder 204 generates encoded audio that is transmitted to the server 101, and the server 101 transmits encoded audio that includes a first audio stream associated with a first avatar mixed with a second audio stream associated with a second avatar. The decoder decodes the encoded audio.

The mixing module 210 determines that the first avatar (or a first user if the virtual environment does not include avatars) is blocked by the user associated with the user avatar (or a second user if the virtual environment does not include avatars). For example, the user may have previously selected the first avatar from a user interface generated by the user interface module 202. In some embodiments, the mixing module 210 identifies whether the decoded audio includes an audio stream associated with the first avatar by determining whether a first VAD signal associated with the first avatar indicates that the first audio stream includes speech. For example, the mixing module 210 may determine whether the first VAD signal includes a bit that is 1 to indicate that the first audio stream includes speech or the bit is 0 to indicate that the first audio stream does not include speech.

If the first VAD signal associated with the first avatar indicates that the first audio stream includes speech, the mixing module 210 determines a location of the first avatar in the virtual environment to determine a location in the virtual environment from which the first avatar is speaking. The location of the first avatar in the virtual environment may include a spatial location and an orientation of the first avatar in the virtual environment. In some embodiments, the orientation may not be a part of the location of the first avatar.

In some embodiments, the first audio stream may be associated with a location in the virtual environment, but not an avatar. For example, the first audio stream may be associated with an object in the virtual environment. In some embodiments, the first audio stream may not be associated with an avatar or an object at all, but the noise may still be emitted from a particular location. For example, the virtual environment may be audio only, but audio streams are still spatialized (i.e., placed in different locations within the virtual environment) in order to improve the audio quality of the virtual experience.

The mixing module 210 generates additional audio. In some embodiments, the additional audio is associated with the location in the virtual environment. The additional audio may be one or more streams of artificial speech that include an unintelligible mix of sound and/or random pseudo-speech, such as walla, which is a sound effect imitating the murmur of a crowd in the background. The artificial speech is used to effectively block (by playing the artificial speech over the mixed audio) the first audio stream from the blocked first avatar. In some embodiments, the artificial speech may include pre-recorded speech sounds, pre-recorded speech-like sounds, speech sounds synthesized in real-time, and/or speech-like sounds synthesized in real-time. In some embodiments, the mixing module 210 generates the additional audio with a decibel level that attenuates as a function of the spatial location and the orientation, for example, based on a distance between the (blocked) first avatar and the user avatar that has blocked the first avatar.

In some embodiments, instead of using the VAD signal, the mixing module 210 uses other signals to avoid recomputing panning or spatialization for the additional audio. In some embodiments, the other signals include a volume of the first audio stream, panning coefficients, and/or per-channel volume coefficients of the first audio stream.

The mixing module 210 may use the orientation of the first avatar to determine a directionality of the first audio stream and consider how the directionality affects panning. Panning is a technique used to spread a mono- or a stereo-sound signal into a new stereo- or multi-channel sound signal. Panning can simulate the spatial perspective of the listener by varying the amplitude or power level of the original source across the new audio channels. For example, audio coming from the 12 o'clock position may be equally distributed across a left speaker 243 and a right speaker 243, whereas audio coming from the 8 o'clock position is received by only the left speaker 243, and audio coming from the 4 o'clock position is received by only the right speaker 243. The mixing module 210 ensures that the additional audio is panned the same way as the first audio stream to so that both audio streams are heard with equal proportions in the left speaker 243 and the right speaker 243. If panning is not taken into consideration, in some embodiments, a situation may arise where the user's left speaker 243 receives the first audio stream and the user's right speaker 243 receives the additional audio stream.

In some embodiments, the mixing module 210 uses a panning coefficient to determine how the directionality affects panning where the panning coefficient is a weight for describing a percentage of audio that is produced by the left speaker 243 and a percentage of audio that is produced by the right speaker 243. In some embodiments, the mixing module 210 uses panning and/or panning coefficients instead of VAD signals to determine whether the first audio stream includes speech.

In some embodiments, the mixing module 210 uses per-channel volume coefficients of the first audio stream for multi-channel surround system audio formats, such as 5.1, 7.1, 7.4.1, ambisonics, etc. Ambisonics is a three-dimensional sound reproduction system that tries to simulate the sound field at a given point in the virtual environment.

In some embodiments, the mixing module 210 may use a combination of the different features to determine whether the first audio stream includes speech based on at least one selected from the group of a first voice-activity detection (VAD) signal for the first audio stream, a volume of the first audio stream, a panning coefficient associated with the first audio stream, a per-channel volume coefficient associated with the first audio stream, and combinations thereof.

In some embodiments, instead of using the additional audio to block the first audio stream from a blocked first avatar, the mixing module 210 replaces the first audio stream with additional audio for other reasons. For example, the mixing module 210 may perform translation services. The mixing module 210 may translate the first audio stream from a first language associated with the first avatar to a second language associated with the user avatar. The mixing module 210 may then generate the additional audio to block the first audio stream in the first language because it is in a language that is not understood by the user and that would interfere with the user being able to hear the first audio stream in the second language. In another example, the mixing module 210 may replace the first audio stream with additional audio where the additional audio stream includes a modification to the first audio stream based on pitch/tone, voice type, timbre, prosody, emphasis, or inflection. In some embodiments, the mixing module 210 replaces the first audio stream with additional audio where the additional audio stream replaces the first audio stream with animal sounds. The animal sounds may be an exaggeration of the first audio stream based on attributes of animals. For example, where the additional audio represents a sheep sound, the a's of words may be elongated such as replacing "hat" with "haaaat" to sound more like a sheep.

The mixing module 210 mixes the additional audio with the encoded audio. The additional audio is generated with spatial characteristics such that it appears to come from the same (or nearby) location as the first avatar and provides the mixed audio to the speaker 243 for output at the computing device 200.

Example Methods

Figure 3:
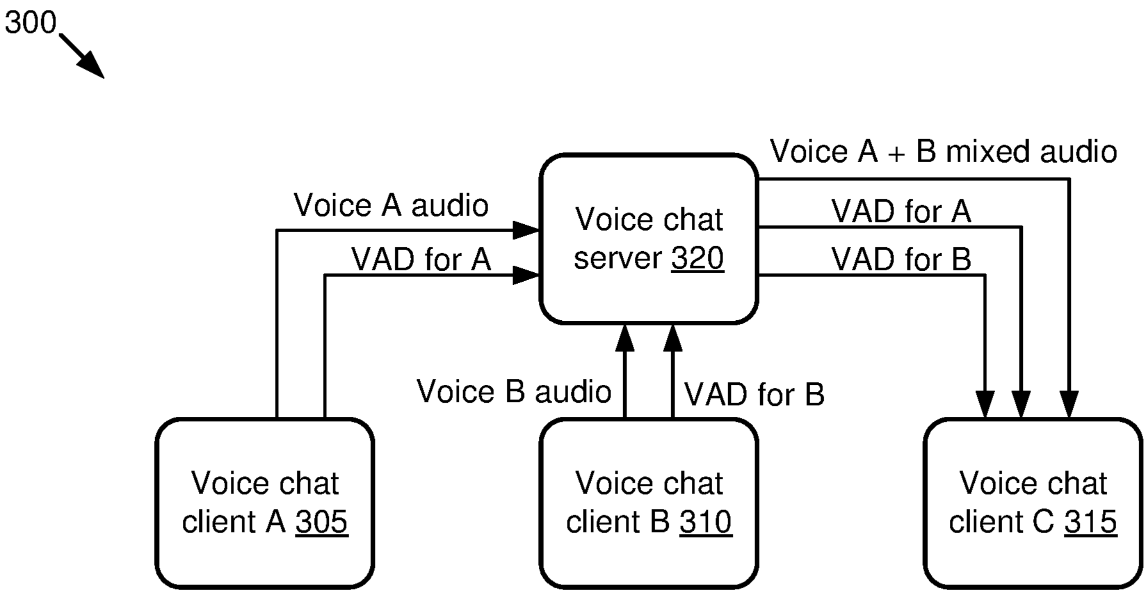
FIG. 3 is a block diagram of an example method to provide mixed audio and voice-activity detection (VAD) signals to a client, according to some embodiments described herein.

FIG. 3 is a block diagram of an example method 300 to provide mixed audio and voice-activity detection (VAD) signals to a client. In FIG. 3, voice chat client A 305 and voice chat client B 310 each generate respective voice audio and a VAD signal. The voice chat server 320 receives the voice A audio and VAD for A from the voice chat client A 305. The voice chat server 320 receives the voice B audio and VAD for B from the voice chat client B 310. The voice chat server 320 decodes the respective audio, generates voice A+B mixed audio (preserving spatial characteristics), and encodes the voice A+B mixed audio. The voice chat server 320 transmits the voice A+B mixed audio, the VAD for A, and the VAD for B to voice chat client C 315. In some embodiments, the voice chat server 320 bundles the voice A+B mixed audio, the VAD for A, and the VAD for B into a single transmission that is sent to the voice chat client C 315.

Figure 4:
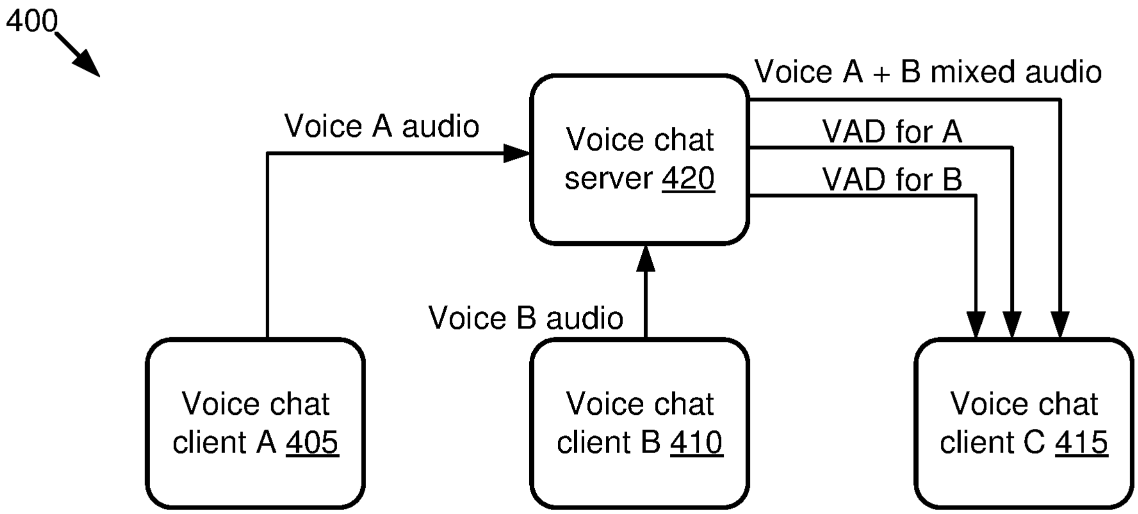
FIG. 4 is another block diagram of an example method to provide mixed audio and VAD signals to a client, where a server generates the VAD signals, according to some embodiments described herein.

FIG. 4 is an example block diagram of another example method 400 to provide mixed audio and VAD signals to a client, where a server generates the VAD signals. In FIG. 4, voice chat client A 405 transmits voice A audio to the voice chat server 420. Voice chat client B 410 transmits voice B audio to the voice chat server 420. The voice chat server 420 generates voice A+B mixed audio, VAD for A, and VAD for B. The voice chat server 420 transmits the voice A+B mixed audio, VAD for A, and VAD for B to the voice chat client C 415 either as a single bundle or separately.

Figure 5:
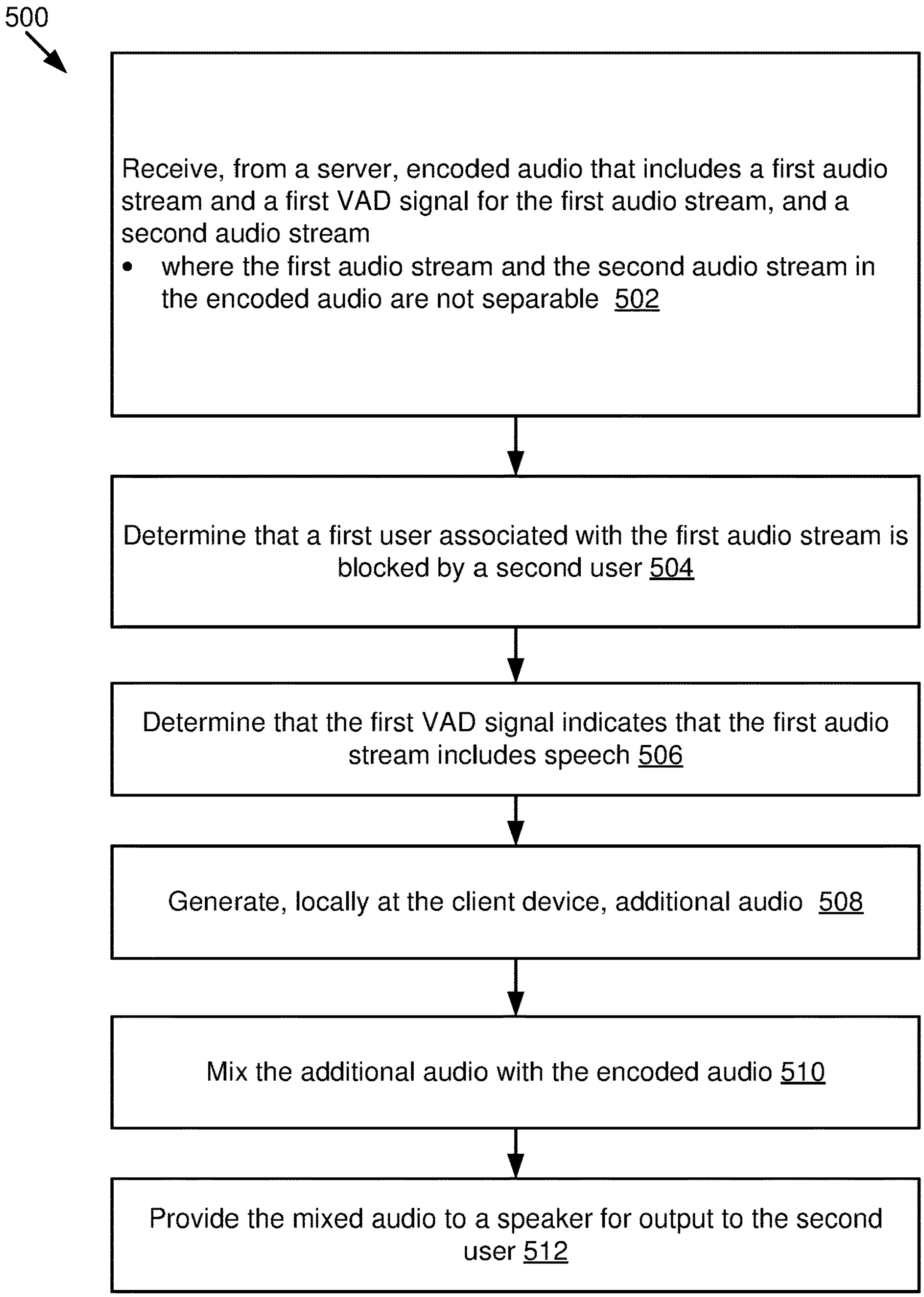
FIG. 5 is a flow diagram of an example method to obscure particular audio streams, according to some embodiments described herein.

FIG. 5 is an example flow diagram of a method 500 to provide audio playback with particular audio sources obscured. In some embodiments, all or portions of the method 500 are performed by the metaverse application 104 stored on the client device 115 as illustrated in FIG. 1 and/or the metaverse application 104 stored on the computing device 200 of FIG. 2.

The method 500 may begin with block 502. At block 502, encoded audio that includes a first audio stream and a first VAD signal for the first audio stream is received from a server. The first audio stream and the second audio stream in the encoded audio are not separable (the encoded audio is in a format such that the mixed two audio streams cannot be isolated). Block 502 may be followed by block 504.

At block 504, a first user associated with the first audio stream is determined to be blocked by a second user. Block 504 may be followed by block 506.

At block 506, the first VAD signal is determined to indicate that the first audio stream includes speech. Block 506 may be followed by block 508.

At block 508, additional audio is generated locally at the client device. Block 508 may be followed by block 510.

At block 510, the additional audio is mixed with the encoded audio. Block 510 may be followed by block 512.

At block 512, the mixed audio is provided to a speaker for output to the second user.

Figure 6:
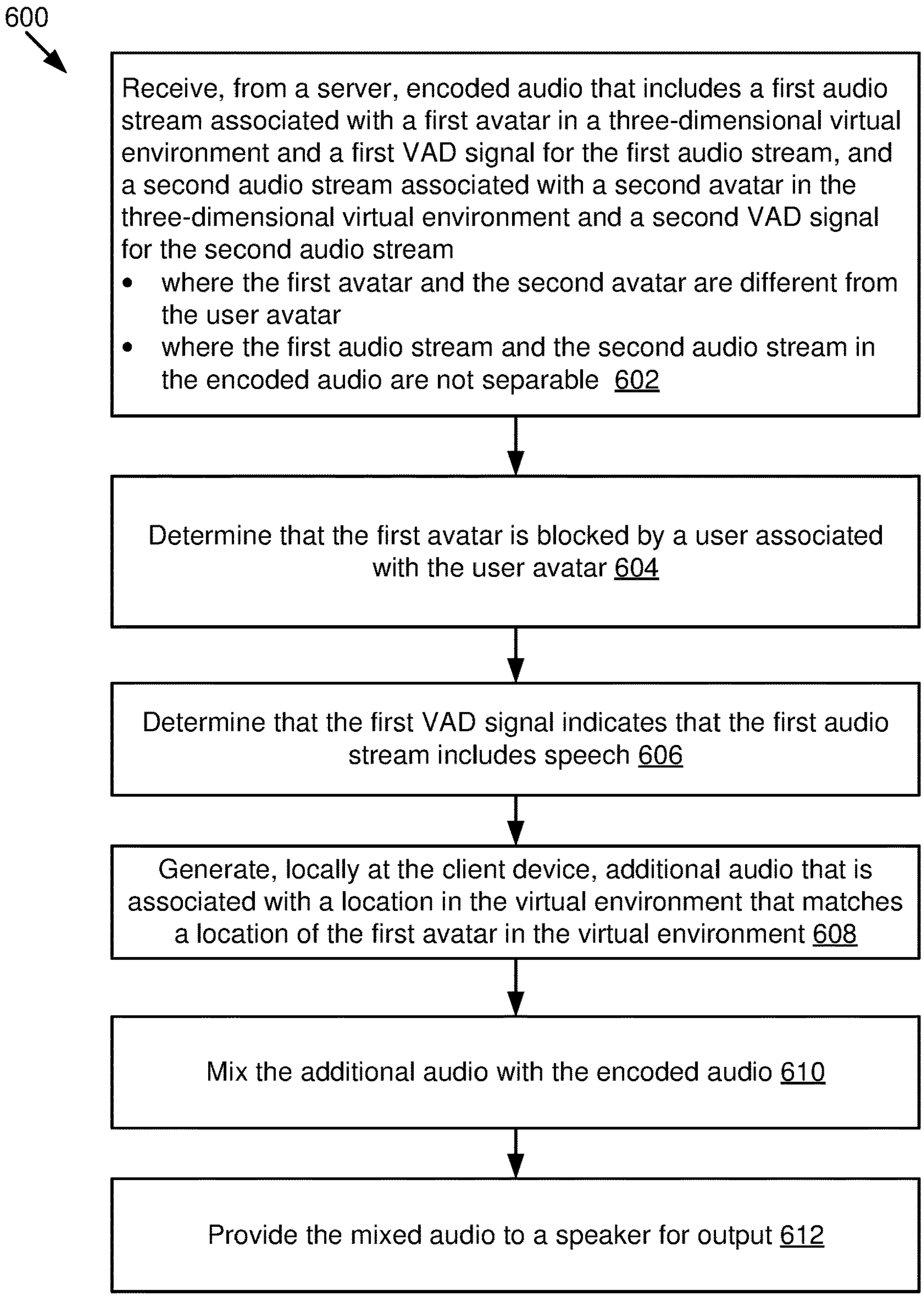
FIG. 6 is a flow diagram of another example method to obscure particular audio streams, according to some embodiments described herein.

FIG. 6 is an example flow diagram of a method 600 to provide audio playback with particular audio sources obscured. In some embodiments, all or portions of the method 600 are performed by the metaverse application 104 stored on the client device 115 as illustrated in FIG. 1 and/or the metaverse application 104 stored on the computing device 200 of FIG. 2.

The method 600 may begin with block 602. At block 602, encoded audio that includes a first audio stream associated with a first avatar in a three-dimensional virtual environment and optionally, a first VAD signal for the first audio stream is received from a server. The first avatar and the second avatar are different from the user avatar. The first audio stream and the second audio stream in the encoded audio are not separable (the encoded audio is in a format such that the mixed two audio streams cannot be isolated). The total number of audio streams in the encoded audio stream can be any number, e.g., three, four, hundred, thousand, ten thousand, or more.

In some embodiments, the number of audio streams may be related to the number of avatars in a virtual environment to which the encoded audio stream corresponds. For example, if the virtual environment is a concert venue with 15,000 avatars, the encoded audio stream may be mix of about 15,000 audio streams (or less, depending on how many avatars are providing audio input), each corresponding to a particular avatar. For example, if the concert is ongoing with 10 avatars on stage and the audience is quiet, the encoded audio stream may include 10 streams corresponding to avatars on stage. If while the concert is ongoing, the avatars in the audience are clapping or singing along, the encoded audio stream may include thousands of audio streams corresponding to the avatars in the audience. In various examples, depending on the type of virtual environment (e.g., meeting room, coffee shop, concert hall, open air venue, or any type of virtual setting, the number of audio streams may vary). Further, the characteristics of each audio stream may be based on a type of the virtual environment, e.g., the rate of which the audio volume attenuates with distance, whether there are echoes, etc. Further, in some embodiments, non-avatar objects (e.g., musical instruments at a concert venue, coffee machine in a coffee shop, etc.) may provide additional audio that is also part of the audio stream. In some embodiments, avatar audio and/or audio from non-avatar objects may be blocked. Block 602 may be followed by block 604.

At block 604, the first avatar is determined to be blocked by a user associated with the user avatar. Block 604 may be followed by block 606.

At block 606, the first VAD signal (if available) is determined to indicate that the first audio stream includes speech. In some embodiments, the first VAD signal is generated by a first client device associated with the first avatar. In some embodiments, the first VAD signal is a binary signal generated by the server and the binary signal indicates whether the first avatar is speaking or not speaking based on whether a decibel level of the first audio stream meets a threshold decibel level. The VAD signal may also include a single bit per time period, e.g., wherein the single bit has a value of 1 if the first avatar is speaking and 0 if the first avatar is not speaking and where the time period of the VAD signal corresponds to a speed of human speech. In some embodiments, determining that the first audio stream includes speech is further based on a volume of the first audio stream, a panning coefficient associated with the first audio stream, and/or a per-channel volume coefficient associated with the first audio stream. Block 606 may be followed by block 608.

At block 608, the client device locally generates additional audio that is associated with a location in the virtual environment that matches a location of the first avatar in the virtual environment. The location of the first avatar may include a spatial location and (optionally), an orientation of the first avatar in the 3D virtual environment. The spatial location and the orientation may be used to generate the additional audio with a decibel level that attenuates as a function of the spatial location and the orientation of the first avatar (e.g., based on a distance between the first avatar and the user avatar that blocked the first avatar). In some embodiments, the orientation of the first avatar is used to determine the directionality of the first audio stream, which affects how the first audio stream is panned. The panning of the additional audio matches the first audio stream to avoid a situation where the first audio stream is heard in the user's left ear and the additional audio is heard in the user's right ear. Block 608 may be followed by block 610.

At block 610, the additional audio is mixed with the encoded audio. The additional audio may be synthetically generated pseudo-speech nonsense sounds (or any other type of audio) that drown out the first audio stream. In some embodiments, the additional audio is generated from artificial speech, such as pre-recorded speech sounds, pre-recorded speech-like sounds, speech sounds synthesized in real-time, and/or speech-like sounds synthesized in real-time.

In some embodiments, the first audio stream is from a first language and the user avatar is associated with a second language. The method 600 may also include translating the first audio stream from the first language to the second language associated with the user avatar. The additional audio is then used to drown out the first audio stream because it is in a different language and would make it difficult for the user to perceive the first audio stream translated to the second language. Block 610 may be followed by block 612.

At block 612, the mixed audio is provided to a speaker for output. In some embodiments, the mixed audio is decoded before the mixed audio is provided to the speaker.

In some embodiments (e.g., where the VAD signal is not available), block 606 may not performed and block 604 may be followed by block 608. In these embodiments, blocks 608-612 are performed based on indication that the first avatar is blocked. Generation of the additional audio (block 608), mixing the additional audio with the encoded audio (610), and providing the mixed audio for output (block 610) may be performed throughout the audio playback, as long as the first avatar is blocked. In this embodiment, the audio playback essentially blocks audio from the location associated with the blocked avatar, irrespective of whether the blocked avatar is providing audio.

While the foregoing description refers to a first avatar that is blocked by a user avatar, it will be appreciated that a virtual environment may include any number of avatars, with each avatar blocking zero, one, or more other avatars. For each avatar, respective additional audio is generated (e.g., locally on the client device of the user associated with the avatar) to block out audio from the corresponding blocked avatars. In some embodiments, e.g., if a user blocks three avatars at different locations, three distinct portions of additional audio may be generated, each corresponding to a particular blocked avatar. In some embodiments, if two or more blocked avatars are co-located (at or near a same location), a single portion of additional audio may be generated corresponding to the two or more blocked avatars.

In some embodiments, a server (e.g., server 101) may perform all or portions of method 500. For example, the server may generate respective additional audio for each avatar participating in the virtual environment, and provide it to respective client devices for playback, along with the encoded audio for the virtual environment as a whole. In this embodiment, the server performs the computation to generate the additional audio (which may be particularly suitable for client devices with low computational capacity, available battery life, or other constraints, but capable of receiving the additional audio over a network).

In some embodiments, a client device (e.g., device 115) may perform all or portions of method 500. For example, the client device may generate additional audio for blocked avatars corresponding to a user avatar associated with the client device and mix it with the encoded audio received from a server to provide audio playback with blocking. These embodiments may be particularly suitable for client devices that have sufficient computational capacity and other resources to generate the additional audio and may save network bandwidth (by eliminating transmission of the additional audio from the server to the client device).

In some embodiments, the server may generate additional audio for a subset of client devices, while other client devices generate their own additional audio.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

Various embodiments described herein include obtaining data from various sensors in a physical environment, analyzing such data, generating recommendations, and providing user interfaces. Data collection is performed only with specific user permission and in compliance with applicable regulations. The data are stored in compliance with applicable regulations, including anonymizing or otherwise modifying data to protect user privacy. Users are provided clear information about data collection, storage, and use, and are provided options to select the types of data that may be collected, stored, and utilized. Further, users control the devices where the data may be stored (e.g., client device only; client+server device; etc.) and where the data analysis is performed (e.g., client device only; client+server device; etc.). Data are utilized for the specific purposes as described herein. No data is shared with third parties without express user permission.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory.

These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMs, EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

What is claimed is:

1. A computer-implemented method performed at a client device associated with a user avatar participating in a three-dimensional (3D) virtual environment hosted by a server, the method comprising:

receiving, from the server, encoded audio that includes a first audio stream associated with a first avatar in the 3D virtual environment and a first voice-activity detection (VAD) signal for the first audio stream, and a second audio stream associated with a second avatar in the 3D virtual environment and a second VAD signal for the second audio stream, wherein the first avatar and the second avatar are different from the user avatar and wherein the first audio stream and the second audio stream in the encoded audio are not separable;

determining that the first avatar is blocked by a user associated with the user avatar;

determining that the first VAD signal indicates that the first audio stream includes speech;

generating, locally at the client device, additional audio;

mixing the additional audio with the encoded audio; and providing the mixed audio to a speaker for output on the client device.

2. The computer-implemented method of claim 1, wherein the additional audio includes artificial speech selected from a group of pre-recorded speech sounds, pre-recorded speech-like sounds, speech sounds synthesized in real-time, speech-like sounds synthesized in real-time, and combinations thereof.

3. The computer-implemented method of claim 2, wherein:

the additional audio is associated with a location in the virtual environment that matches a location of the first avatar in the virtual environment;

the location of the first avatar includes a spatial location and an orientation of the first avatar in the 3D virtual environment; and generating the additional audio includes generating the additional audio with a decibel level that attenuates as a function of the spatial location and the orientation.

4. The computer-implemented method of claim 1, wherein the first VAD signal is generated by a first client device associated with the first avatar.

5. The computer-implemented method of claim 1, wherein:

the first VAD signal is a binary signal generated by the server; and the binary signal indicates whether the first avatar is speaking or not speaking based on whether a decibel level of the first audio stream meets a threshold decibel level.

6. The computer-implemented method of claim 1, wherein the first VAD signal includes a single bit per time period, a value of the single bit indicates whether the first avatar is speaking, and the time period of the first VAD signal corresponds to a speed of human speech.

7. The computer-implemented method of claim 1, wherein determining that the first VAD signal indicates that the first audio stream includes speech is further based on at least one selected from the group of a volume of the first audio stream, a panning coefficient associated with the first audio stream, a per-channel volume coefficient associated with the first audio stream, and combinations thereof.

8. A non-transitory computer-readable medium with instructions that, when executed by one or more processors at a client device, cause the one or more processors to perform operations, the operations comprising:

receiving, from a server, encoded audio that includes a first audio stream associated with a first avatar in a three-dimensional (3D) virtual environment and a second audio stream associated with a second avatar in the 3D virtual environment, wherein the first avatar and the second avatar are different from the user avatar and wherein the first audio stream and the second audio stream in the encoded audio are not separable;

determining that the first avatar is blocked by a user associated with the user avatar;

generating, locally at the client device, additional audio that is associated with a location in the virtual environment that matches a location of the first avatar in the virtual environment;

mixing the additional audio with the encoded audio; and providing the mixed audio to a speaker for output on the client device.

9. The computer-readable medium of claim 8, wherein the operations further include:

receiving, from the server, a first voice-activity detection (VAD) signal for the first audio stream and a second VAD signal for the second audio stream; and determining that the first VAD signal indicates that the first audio stream includes speech, wherein the additional audio is generated responsive to the determining.

10. The computer-readable medium of claim 9, wherein the first VAD signal is generated by a first client device associated with the first avatar.

11. The computer-readable medium of claim 9, wherein:

the first VAD signal is a binary signal generated by the server; and the binary signal indicates whether the first avatar is speaking or not speaking based on whether a decibel level of the first audio stream meets a threshold decibel level.

12. The computer-readable medium of claim 8, wherein the operations further include:

determining that the first audio stream includes speech based on at least one selected from the group of a first voice-activity detection (VAD) signal for the first audio stream, a volume of the first audio stream, a panning coefficient associated with the first audio stream, a per-channel volume coefficient associated with the first audio stream, and combinations thereof.

13. The computer-readable medium of claim 8, wherein the additional audio includes artificial speech selected from a group of pre-recorded speech sounds, pre-recorded speech-like sounds, speech sounds synthesized in real-time, speech-like sounds synthesized in real-time, and combinations thereof.

14. The computer-readable medium of claim 13, wherein the location of the first avatar includes a spatial location and an orientation of the first avatar in the 3D virtual environment and wherein generating the additional audio includes generating the additional audio with a decibel level that attenuates as a function of the spatial location and the orientation.

15. A system comprising:

a processor; and a memory coupled to the processor, with instructions stored thereon that, when executed by the processor, cause the processor to perform operations comprising:

receiving, from a server, encoded audio that includes a first audio stream and a first voice-activity detection (VAD) signal for the first audio stream, and a second audio stream, wherein the first audio stream and the second audio stream in the encoded audio are not separable;

determining that a first user associated with the first audio stream is blocked by a second user;

determining that the first VAD signal indicates that the first audio stream includes speech;

generating additional audio;

mixing the additional audio with the encoded audio; and providing the mixed audio to a speaker for output to the second user.

16. The system of claim 15, wherein:

the first audio stream is associated with a three-dimensional (3D) virtual environment; and the additional audio is associated with a location in the virtual environment that matches a location of the first audio stream.

17. The system of claim 15, wherein:

the first audio stream is associated with a first avatar in a three-dimensional (3D) virtual environment;

the second audio stream is associated with a second avatar in the 3D virtual environment; and the additional audio is associated with a location in the virtual environment that matches a location of the first avatar in the virtual environment, the location of the first avatar including a spatial location and an orientation of the first avatar in the 3D virtual environment and wherein generating the additional audio includes generating the additional audio with a decibel level that attenuates as a function of the spatial location and the orientation.

18. The system of claim 15, wherein the first VAD signal is generated by a first client device associated with the first avatar.

19. The system of claim 15, wherein:

the first VAD signal is a binary signal generated by the server; and the binary signal indicates whether the first avatar is speaking or not speaking based on whether a decibel level of the first audio stream meets a threshold decibel level.

20. The system of claim 15, wherein determining that the first VAD signal indicates that the first audio stream includes speech is further based on at least one selected from the group of a volume of the first audio stream, a panning coefficient associated with the first audio stream, a per-channel volume coefficient associated with the first audio stream, and combinations thereof.

* * * * *